United States Patent [19]

Gondo et al.

[11] Patent Number: 4,488,906
[45] Date of Patent: Dec. 18, 1984

[54] HYDROGEN STORAGE METAL MATERIAL

[75] Inventors: Hisashi Gondo; Ryutaro Matsumoto; Jiro Ohno; Ryoichi Suzuki, all of Kawasaki, Japan

[73] Assignee: Nippon Steel Corporation, Tokyo, Japan

[21] Appl. No.: 542,197

[22] Filed: Oct. 14, 1983

[30] Foreign Application Priority Data

Oct. 15, 1982 [JP] Japan .................... 57-179896

[51] Int. Cl.³ .................... C22C 38/28; C22C 32/00
[52] U.S. Cl. .................... 75/123 M; 420/900; 420/417; 420/581
[58] Field of Search ........ 75/123 M; 423/644, 648 R, 423/560; 420/900, 417, 580, 581

[56] References Cited

U.S. PATENT DOCUMENTS 4,079,523  3/1978  Sandrock .................... 34/15

Primary Examiner—L. Dewayne Rutledge
Assistant Examiner—Christopher W. Brody
Attorney, Agent, or Firm—Wenderoth, Lind & Ponack

[57] ABSTRACT

A hydrogen absorbing and desorbing metal material which comprises elements belonging to the IIa-Va groups having the ability to form metal hydrides, and S at an atomic ratio of 0.004–0.04 in terms of one of the elements.

6 Claims, 7 Drawing Figures

HYDROGEN STORAGE METAL MATERIAL

BACKGROUND OF THE INVENTION

1. Field of the Invention

The present invention relates to a metal material for storing hydrogen stably at a high density.

2. Description of the Prior Art

Ways have been developed for storing hydrogen in metals or alloys in the form of metal hydride. The hydrogen retained in a hydrogen storage metal can be easily stored and transported and the metal can be applied to such purposes as hydrogen separation and purification as well as to heat pumps, etc. Typical metal alloys developed for the storage of hydrogen include TiFe, TiMn, TiCo, LaNi$_5$, Mg$_2$Ni and the like. For instance, U.S. Pat. Nos. 3,508,414 and 3,516,263 disclose a method for storing hydrogen using TiFe alloy, and U.S. Pat. No. 4,079,523 also discloses an iron-titanium-mischmetal alloy for hydrogen storage. Each of these hydrogen storage alloys has its own specific characteristics as regards activation, plateau, hysteresis, etc. and numerous studies have been conducted on how the properties of these alloys can be better adapted to specific applications through the addition of other metal elements.

In a metal material intended for hydrogen storage, the term "plateau" refers generally to the horizontal flatness of an absorption or desorption isotherm obtained from the equilibrium hydrogen pressure-atomic ratio (H/M, where H refers to the atomic weight of hydrogen and M to the atomic weight of a metal element). In case the plateau is not horizontally flat, at the time of hydrogen desorption, the hydrogen pressure is so gradually decreased that hydrogen hardly desorbs unless the desorption pressure tends to be low. Further, at the time of hydrogen absorption, with the increase in the amount of hydrogen storage, hydrogen is hardly absorbed unless the hydrogen pressure is much increased.

In the use of a hydrogen storage alloy having a plateau for storing hydrogen, it is difficult to maintain the hydrogen desorption pressure at a constant value. Further with a decrease of the desorption pressure, the amount of desorption decreases. In the use of the hydrogen storage alloy in an air conditioning system or in a heat engine of the waste heat recovery type, it is desirable that the pressure difference ($\Delta P$) between the equilibrium dissociation pressure of two different types of alloys and the equilibrium absorption pressure of the other alloy should be constant independently of the hydrogen content of the alloy (H/M). When the plateau property is horizontally flat, the hydrogen desorption and absorption reactions of both alloys proceed smoothly since the pressure difference ($\Delta P$) is maintained constant.

In the TiFe alloy, in order to activate the alloys to be reactive to hydrogen, it is required to periodically subject the alloy to elevated temperatures of higher than 400° C.-vacuum and to high pressure hydrogen treatment (30-60 Kg/cm$^2$) at room temperature for periods as long as one week. It has been found that this disadvantage can be overcome by replacing a part of the iron with Nb, Mn or Ti. However, although the addition of such an element improves the activation, use of Nb greatly increases the cost of the alloy while use of Mn or Ti disadvantageously results in variation of the hydrogen equilibrium dissociation pressure, thus causing the plateau property to become unsatisfactory. In addition, in the TiMn alloy, in order to enhance the plateau property, the addition of other elements such as Zr, V, and Cr has been disclosed.

In general, when the alloy absorbs hydrogen, its volume expands by 10-30%. The repetitive absorption and desorption of hydrogen in the alloy is thus accompanied by repetitive expansion and contraction of the alloy with the result that the alloy is pulverized. Alloys such as FeTi-oxide, FeTiNb, FeTiMn, FeTiNbZr, etc. are known for their easy activation but they tend to be pulverized easily. The pulverized alloy will intermingle into the hydrogen gas desorbed from the alloy to cause the pipes and valves of the system to be clogged. Moreover, when it diffuses into the open air, it gives rise to environmental pollution.

Thus, although methods for improving the characteristic of hydrogen absorbing alloys by the addition of metal elements have been proposed, there still remain unsolved problems in connection with production cost, plateau property, amount of hydrogen storage, service life and various other practical aspects.

SUMMARY OF THE INVENTION

It is a prime object of the present invention to provide a novel alloy which has a great hydrogen storage capacity and desorption capacity at room temperature.

It is another object of the invention to provide a novel alloy for hydrogen storage which has an excellent plateau property at the hydrogen equilibrium pressure.

These and further objects of the invention, which will become apparent from the following description, are accomplished by adding S to a metal.

DETAILED DESCRIPTION OF THE INVENTION

The inventors observed that some of the metal elements and alloys which form metal hydrides are not only hydride forming elements of the IIa–Va groups of the periodic table (referred to as IIa-Va hereinafter), but also strong sulfide forming elements. This observation induced them to conduct extensive research through which they found that the hydrogen absorption and desorption characteristics of these metals and alloys can be much improved by the addition of S thereto.

For instance, the inventors found that when S is added to a TiFe alloy in an atomic ratio of 0.004–0.04 in terms of Ti (which belongs to IVa), the sulphide of Ti thus produced enhances the activation property and plateau property at the equilibrium pressure of hydrogen dissociation, and also increases the hydrogen storage and desorption near room temperature.

Differently from the prior art wherein attempts have been made to improve alloy characteristics by selection of the alloy components and the ratio thereof, the present invention is directed to improving these characteristics by the addition of S and makes it possible to realize such an improvement easily at low cost and without interfering with the properties of the hydride forming elements.

The invention will be explained primarily with respect to a TiFe alloy which is most difficult to activate among the known alloys for hydrogen storage, and will be described with reference to a preferred embodiment thereof.

Sponge titanium of about 99% purity, electrolytic iron powder, and S powder of about 99% purity (all commercially available) in definite amounts based on the sponge Ti were placed in a water-cooled copper crucible and melted in an argon arc furnace to produce a Ti.Fe.S alloy. The thus obtained ingot was pulverized to a powder of less than 80 mesh in the air to prepare a sample.

Figure 1:
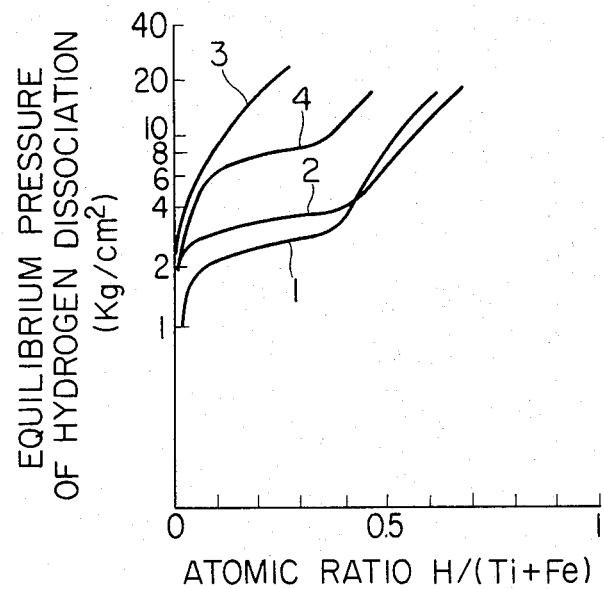
FIG. 1 is a graphic view showing an isotherm of hydrogen desorption when S is added to Ti$_{0.95}$Fe (curves 1, 3) in an atomic ratio of 0.004 in terms of Ti (curves 2, 4)

FIG. 1 shows the isotherms of hydrogen desorption for $Ti_xFe$ at 25° C. (curves 1, 2) and 50° C. (curves 3, 4) in which x is less than 1, namely the alloy $Ti_{0.95}Fe$. In the case of curves 2 and 4, the $Ti_{0.95}Fe$ was mixed with S in an atomic ratio of 0.004 in terms of Ti. As compared with the curves 1 and 3 for the alloy without addition of S, it is clear from the curves 2 and 4 that the plateau property improved and the amount of hydrogen storage increased. Furthermore, the activation was considerably improved so that activation was possible within 10 hours (repetition time, the same as hereinafter) and 100° C. (treatment temperature under vacuum, the same as hereinafter) while, on the contrary, with no addition of S, the activation required more than one week and 450° C. (Completion of activation is defined as the state where H/M becomes 0.5).

Figure 2:
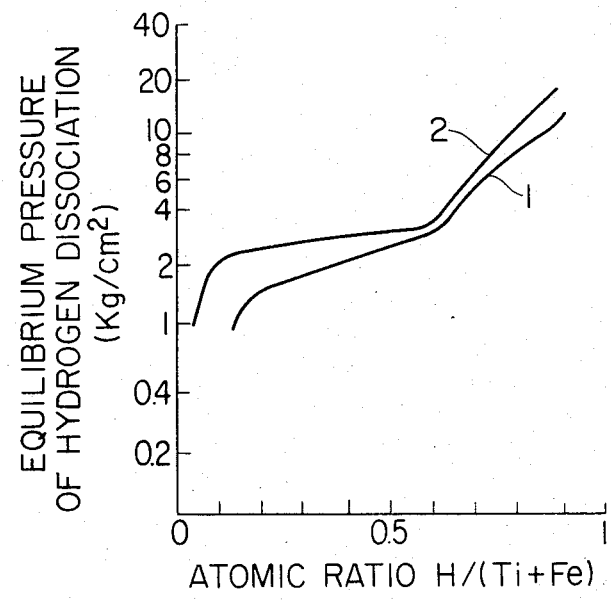
FIG. 2 is a graphic view showing an isotherm at 25° C. when S is added to Ti$_{1.05}$Fe (curve 1) in terms of Ti in an atomic ratio of 0.016 (curve 2)

FIG. 2 shows the isotherms of hydrogen desorption curves for $Ti_xFe$ in which x is more than 1, namely $Ti_{1.05}Fe$. In the case of curve 2 the $Ti_{1.05}Fe$ was mixed with S in an atomic ratio of 0.016 in terms of Ti. At the desorption temperature of 25° C., it is seen that the alloy without S (curve 1) exhibits almost no plateau while, in the case of the alloy with S (curve 2), the plateau property is greatly improved and the amount of hydrogen desorbed is increased. In addition, activation is possible within 10 hours and 80° C.

Figure 3:
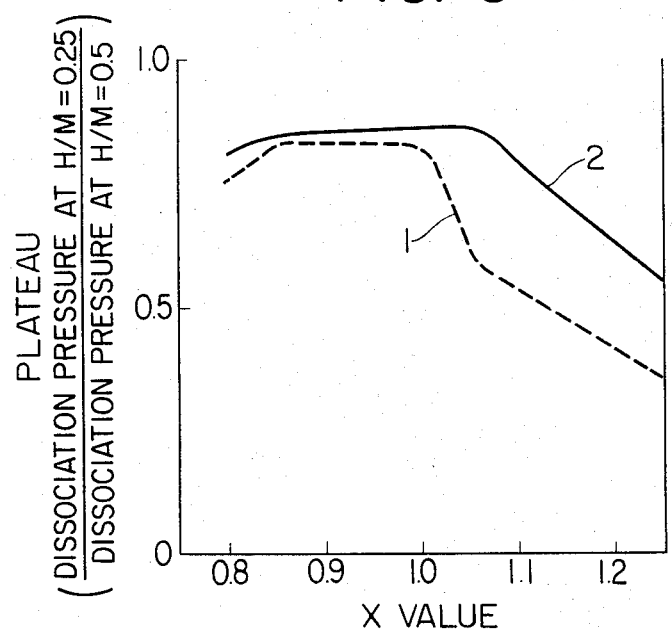
FIG. 3 is a graphic view of the plateau in which one alloy is not mixed with S (curve 1) and the other alloy is mixed with S in an atomic ratio of 0.016 in terms of Ti (curve 2)

FIG. 3 shows the improved plateau at 25° C. due to the addition of S. The parameter for evaluating the plateau property was defined as follows:

(Dissociation pressure at H/M=0.25)/(Dissociation pressure at H/M=0.5)

In FIG. 3, this value is represented on the ordinate and the x value of $Ti_xFe$ on the abscissa. If the x value exceeds 1, with no addition of S, the plateau property rapidly deteriorates as shown by the curve 1. On the other hand, when S is added in an atomic ratio of 0.016 in terms of Ti, the x value is maintained constant to 1.07 as shown by the curve 2. Even when x exceeds 1.07, the deterioration in plateau property is only gradual.

Figure 4:
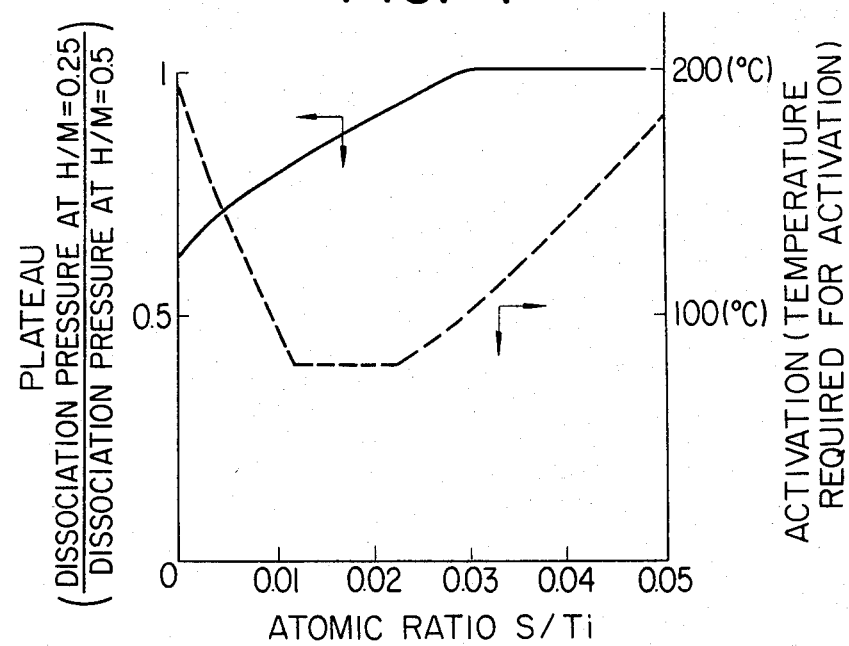
FIG. 4 is a graphic view showing the effect of S on the plateau and activation.

FIG. 4 indicates the relation of plateau and activation to the amount of addition of S where the x value is 1.05.

From the above, it follows that the concentration range of S in which good activation and good plateau property (plateau property: more than 0.7; temperature required for activation: less than 150° C.) are attained is 0.004–0.04 (atomic ratio).

Figure 5:
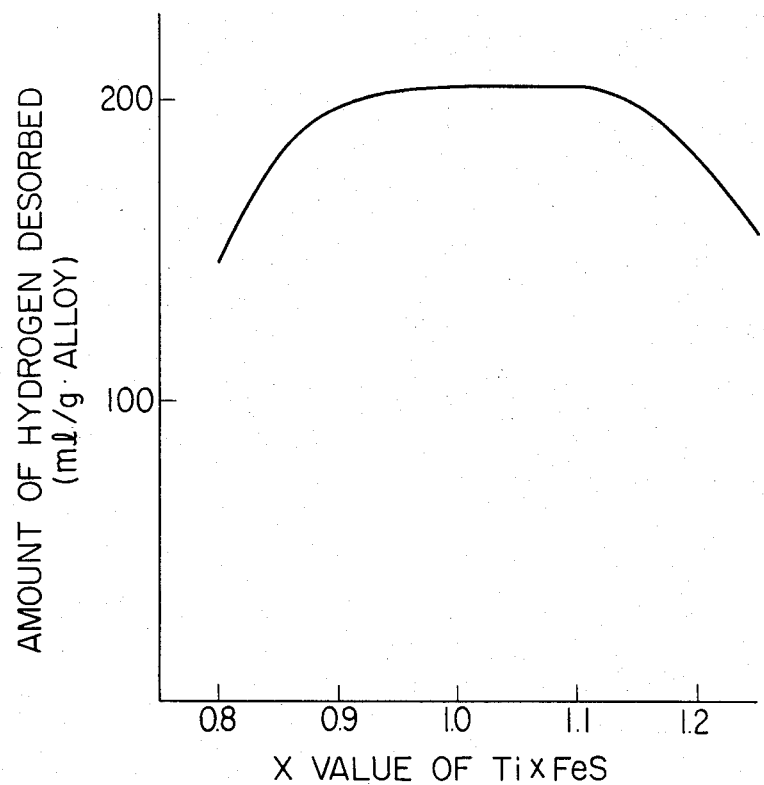
FIG. 5 is a graphic view showing the relation between x of the alloy Ti$_x$Fe and the amount of hydrogen desorbed at 25° C. wherein x is in the range of 0.80-1.25 and S is added in an atomic ratio of 0.016 in terms of Ti.

FIG. 5 shows the amount of hydrogen desorbed at 25° C. by $Ti_xFe$ mixed with S in an atomic ratio of 0.016 in terms of Ti for values of x in the range of 0.80–1.25. The range of x values for which the amount of the desorbed hydrogen can be considered especially good, i.e. not less than 180 ml/g.alloy, is $0.85 < x < 1.20$. This range is much broader than that of 0.95–1.05 for alloys containing no S as in the prior art.

The inventors were unable to find any reference in the literature to TiFe alloys containing S as an impurity. According to the inventors' analysis of TiFe alloys produced by a conventional method or obtained on the market, however, the amount of S has been in the range of about 0.004–0.006 wt%. If this amount is expressed in an atomic ratio in terms of Ti, it comes to about 0.0002.

Figure 6:
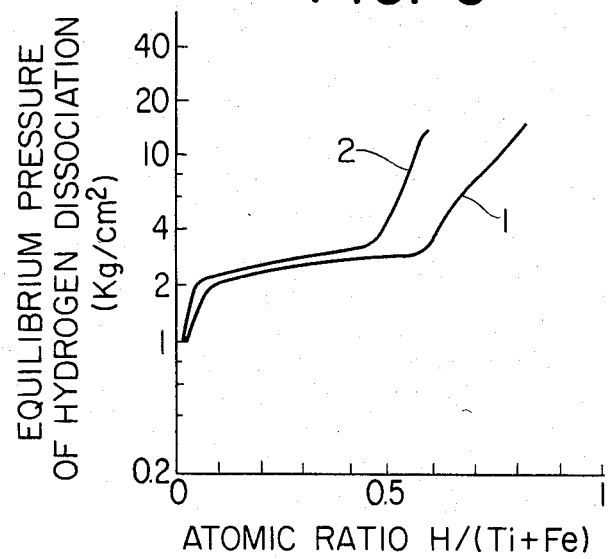
FIG. 6 is a comparative graph showing the isotherm of hydrogen desorbed for Ti$_{1.05}$FeS$_{0.0168}$ (curve 1, an embodiment of the invention) and for the known TiFe (curve 2) at 25° C.

Activation of such a TiFe alloy requires treatment at a high temperature of 450° C. under vacuum and at room temperature under a hydrogen pressure of 30–60 kg/cm$^2$ for a period of about one week. On the contrary, however, the alloy of the present invention can be activated at a temperature of less than 100° C. under vacuum and at room temperature under a hydrogen pressure of 30 kg/cm$^2$ for a period of about 10 hours. Moreover, it exhibits a plateau which, as shown by curve 1 ($Ti_{1.05}FeS_{0.0168}$) of FIG. 6, is much broader than that of the prior art alloy as shown by curve 2 in the same figure.

Figure 7:
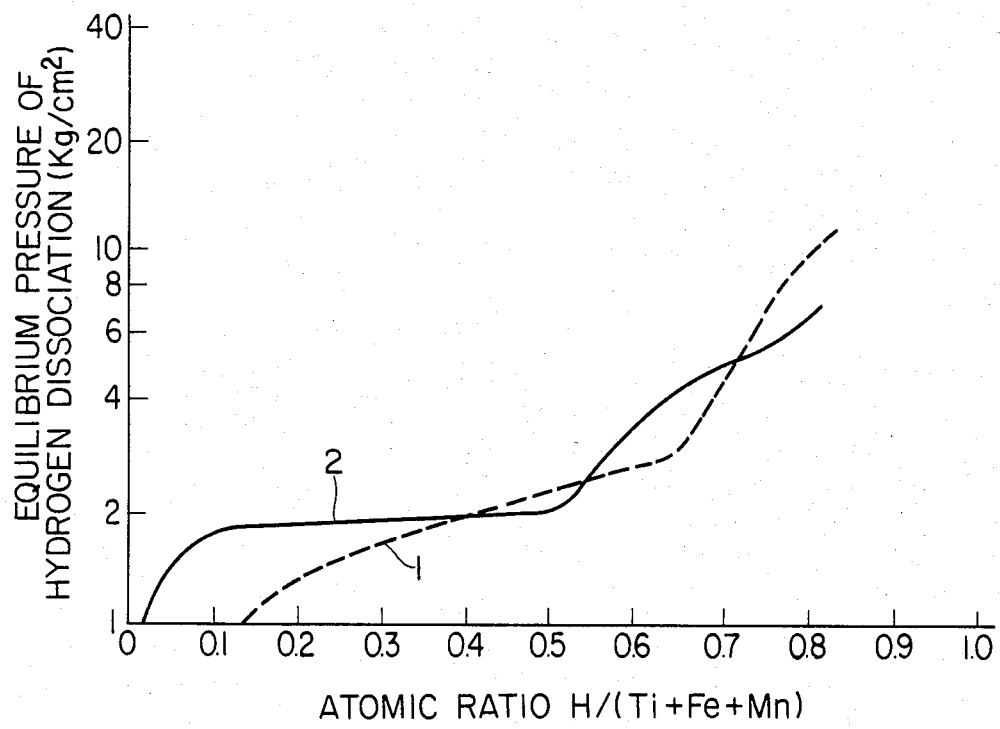
FIG. 7 is also a comparative graph showing the isotherm of hydrogen desorbed for the known Ti-Fe$_{0.9}$Mn$_{0.1}$ alloy (curve 1) and for Ti$_{0.95}$Fe$_{0.9}$Mn$_{0.1}$S$_{0.1}$ (curve 2, an embodiment of the invention) at 25° C., respectively.

Again, TiFeMn type alloys have better activation properties than TiFe type alloys and can be activated at a temperature of 100°–150° C. under vacuum and at room temperature under a high pressure hydrogen treatment of 30 kg/cm$^2$. It is sufficient for the treatment to be repeated for about one day. However, the hydrogen dissociation equilibrium pressure of, for example, $TiFe_{0.9}Mn_{0.1}$, a typical alloy of this type, is not constant, as shown by curve 1 of FIG. 7, so that the plateau property is not good. It is seen that Mn improves the activation property but deteriorates the plateau property. Addition of S to an alloy of the TiFeMn type improves its activation property even further. Furthermore, as shown by curve 2 of FIG. 7, an alloy with the composition of $Ti_{0.95}Fe_{0.9}Mn_{0.1}S_{0.01}$ was found to exhibit an improved plateau property in addition to improved activation property. The above-mentioned alloy can be activated at 80° C. under vacuum and for a period of 4 to 5 hours, and the plateau is remarkably improved as shown in FIG. 7. The preferable amount of S addition is the same as that for TiFe alloy and particularly good effect is obtained when S is added in an atomic ratio of 0.004–0.04 in terms of Ti.

U.S. Pat. No. 4,079,523 mentioned earlier discloses that a low-oxygen Fe-Ti-Mischmetal alloy can be melted in the air by adding 0.05–1.5 wt% mischmetal (referred to as Mm hereinafter) to the TiFe alloy. Although the activation conditions for FeTiMm alloy are the same as those for the conventional FeTi alloy, namely the conditions required for activation are 450° C. and a hydrogen pressure of 68 atmospheres, the time required for activation up to H/M=0.6 is stated to have been reduced from 111 hours to 38 hours.

The above Ti-Fe-1.0 wt%Mm (atomic number 57-71) alloy was mixed with S in an atomic ratio of 0.02 in terms of the total amount of Ti and Mm, and melted to produce a novel alloy. It was found that this alloy required only 10 hours for activation when treated at 80°-100° C. and at a hydrogen pressure of 30 kg/cm$^2$, which represents a major improvement in performance.

The FeTiS alloy and FeTiMnS alloy according to this invention were subjected to an endurance test involving repeated hydrogen absorption and desorption. The test showed that the alloys suffered almost no degradation of performance even after 10,000 repetitions.

As regards the particle size of the hydrogen storage alloy after 10,000 repetitions, the average particle size was about 50 μmφ, more than 90% was more than 10 μmφ, and the smallest particle size was 2 μmφ and such small particles accounted for about 0.4% of the total. The degree of powdering was thus very small.

A MmNi$_5$ is a hydrogen storage alloy that is relatively easy to activate. However, this alloy requires the repetition of high pressure hydrogen treatment, at, for example, 70°-80° C.-vacuum, and at room temperature-60 kg/cm$^2$ for a period of about 10 hours. The factor having a particularly large effect on activation is the hydrogen pressure. In practical application of the hydrogen storage alloy on a large scale, easy activation is necessary and, in particular, to be able to activate the alloy under a low hydrogen pressure is an important factor.

It has been confirmed that the MmNi$_5$ alloy mixed with S at an atomic ratio of 0.004-0.04 with respect to Mm can be activated by the repetition of the hydrogen treatment at 60° C.-vacuum and at room temperature-30 kg/cm$^2$ for a period of about five hours. In this case, it is considered that the sulphide compound formed by adding S is dispersed throughout the alloy so as to contribute to the improvement of activation property.

As fully described in the foregoing, in accordance with the present invention S added to the hydrogen storage alloy acts on the hydride forming element of the alloy so as to modify its activation property and stabilize the practical characteristics of the hydrogen absorption and desorption of the alloy.

In addition, since the hydrogen storage material of the invention is mixed with inexpensive S, it is most advantageous from the practical and economical aspects, and it is considered that the invention will make a major contribution to industry.

What is claimed is:

1. A hydrogen storage alloy selected from the group consisting of a TiFe alloy and a TiFeMn alloy, said alloy containing S in an atomic ratio of 0.004-0.04 based on the Ti in said alloy.

2. The hydrogen storage alloy of claim 1, which is said TiFe alloy containing S.

3. The hydrogen storage alloy of claim 1, which is said TiFeMn alloy containing S.

4. The hydrogen storage alloy of claim 1, wherein the atomic ratio of Ti to Fe in said hydrogen storage alloy is greater than 0.85 and less than 1.20.

5. A hydrogen storage alloy which is a TiFe Mischmetal alloy having 0.05-1.5 weight % Mischmetal, said alloy containing S in an atomic ratio of 0.004-0.04 based on the sum of the Ti and Mischmetal in said alloy.

6. The hydrogen storage alloy of claim 5, wherein the atomic ratio of Ti to Fe in said hydrogen storage alloy is greater than 0.85 and less than 1.20.

* * * * *